June 30, 1925.  
J. TOLBERT  
SIDEWALK EDGER  
Filed Feb. 18, 1922
1,544,359
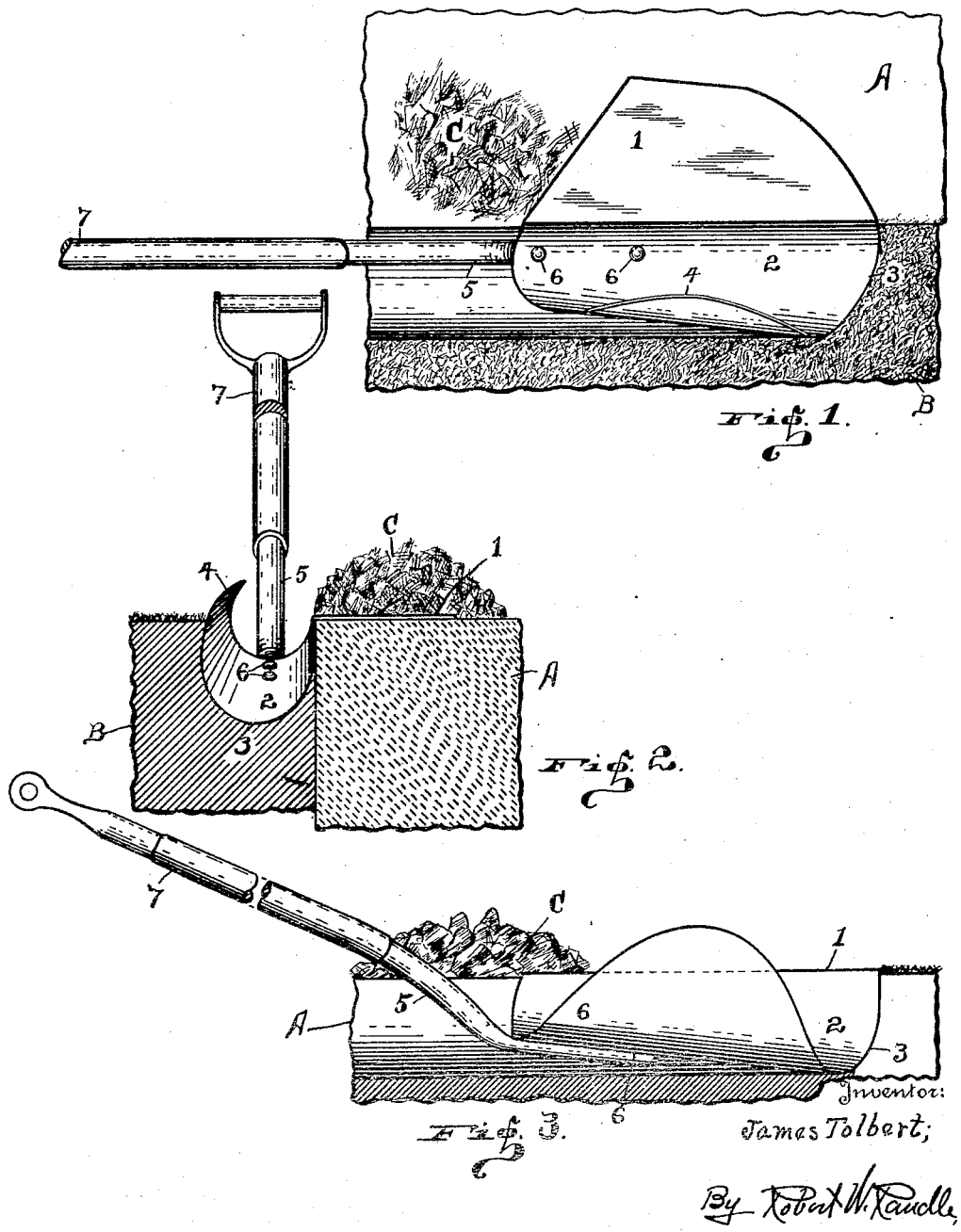

Patented June 30, 1925.

1,544,359

UNITED STATES PATENT OFFICE.

JAMES TOLBERT, OF RICHMOND, INDIANA, ASSIGNOR OF ONE-HALF TO JOSEPH E. DAUGHERTY, OF RICHMOND, INDIANA.

SIDEWALK EDGER.

Application filed February 18, 1922. Serial No. 537,426.

*To all whom it may concern:*

Be it known that I, JAMES TOLBERT, a citizen of the United States, residing in the city of Richmond, in the county of Wayne, State of Indiana, have invented a new and useful Sidewalk Edger, of which the following is a full, clear, and comprehensive specification and exposition, the same being such as will enable others to make and use the same with exactitude.

The object of my present invention, broadly speaking, is to provide a tool which is strong and durable in construction, simple in character, easily operated and controlled, effective in practice, and which can be manufactured and sold at a comparatively low price.

More particularly stated, my object is to provide a tool for trimming the edges of lawns, particularly where the lawn joins a walkway, whereby the grass or sod is removed adjacent to the walk and at the same time a channel or gutter is provided by which surplus water is prevented from running across the walk and providing a way for the water to be quickly disposed of. And at the same time giving the lawn and the walkway an artistic, neat, and finished appearance and pleasing to one's eye.

Other particular objects and advantages of the invention will be brought out in the course of the following description, and that which is new will be correlated in the appended claim.

The preferred means for carrying out the principles of my invention in a practical manner is shown in the accompanying drawings, in which—

Figure 1 is a top plan view of my tool, showing the same in actual practice. Figure 2 shows a front end elevation of the tool, showing the same in actual practice in connection with a walkway and a portion of the adjoining lawn, the portions of the walk and the lawn being shown in cross section. And Figure 3 is a side elevation of the tool as it would appear in connection with a walkway and as it would appear in actual practice.

Similar indices denote like parts throughout the several views. In order that the construction, the operation, and the advantages of my invention may be more fully understood and appreciated, I will now take up a detailed description thereof, in which I will set forth the same as fully and as clearly as I may.

Referring now to the drawings in detail: Letter A denotes a portion of a concrete walk-way, and B denotes the portion of a lawn which adjoins the walk-way.

The tool comprises the body member which is formed of a single piece of sheet metal, comprising the flat fin 1, which is neither right angular, oblong, or square, but is of the general nature of a trapezium, the forward edge of which is curved.

Joining the longer edge of the fin 1, and integral therewith, is the scoop portion 2, the same being curved whereby it is substantially half-round or U-shaped in cross-section, and it expands or increases in size uniformily from its rear end to its forward end, with the rear end at higher elevation than the front end. The forward end of the scoop portion 2 is sharpened to a cutting edge, as indicated at 3.

The outer or right-hand portion of the body 2 terminates in, or merges into, the curved mould-board 4, which extends upward and inward, enclinding toward the fin 1. The said mould-board portion of the body being that part above the horizontal line which is level with the fin 1.

Numeral 5 denotes the stub handle, which is secured by the rivets 6 to the underside of the rear portion of the center of the scoop portion 2, parallel therewith, and projecting rearward and upward therefrom as shown.

Connected with the stub 5, and extending rearward and upward therefrom, is the main handle 7, of any desired length or shape.

It is well known that on the sides of a walkway the sod frequently grows over the edges of the walk and the soil washes thereover, and frequently causing water to overflow the walk, washing dirt thereon, and making the walk damp and unsightly. By means of my invention the soil or sod is cut away from the edge of the walk, forming a groove or gutter between the walk and the sod, which groove or gutter extends below both the walk and the sod, thereby forming a channel through which water may be carried away whereby the water will not flow from the lawn onto the walk or from the walk onto the lawn.

The use of my tool is very simple and it is easily comprehended from the drawings, wherein the handle may be grasped with one's hands, the tool being then forced forward with the fin 1 always in contact with the surface of the walk and acting as a guide by which the work of the tool will be uniform, the edge 3 cutting through the soil, and as the tool is moved rapidly forward the mould-board 4 will cause the displaced soil or sod to be thrown over onto the walk from where it may be carried away, thereby leaving a channel or gutter of proper and of uniform size throughout, and thereby accomplishing the desideratum of this present invention.

I desire that it be understood that various changes may be made in the several details of construction, without departing from the spirit of the invention and without sacrificing any of the advantages thereof which are new and useful.

Having now fully shown and described my invention, what I claim and desire to secure by Letters Patent of the United States, is—

A side-walk edger comprising a body member formed of a single piece of sheet metal which is trapezium in plan and comprising a flat fin adapted to slide flat upon a walk, a scoop portion which is substantially U-shape in cross section and which expands or increases in size uniformly from its rear end to its forward end with its rear end at a higher elevation than its front end and with its front portion terminating in a cutting edge, a curved moldboard forming the outer portion of said body and located on the side of the body opposite to said fin, and a handle attached to the rear end of said body and at a point between said fin and said moldboard.

JAMES TOLBERT.